April 1, 1969 C. A. TACEY 3,435,541
DIDACTIC DEVICE FOR TEACHING MATHEMATICS TO CHILDREN
Filed Aug. 1, 1967 Sheet 1 of 4
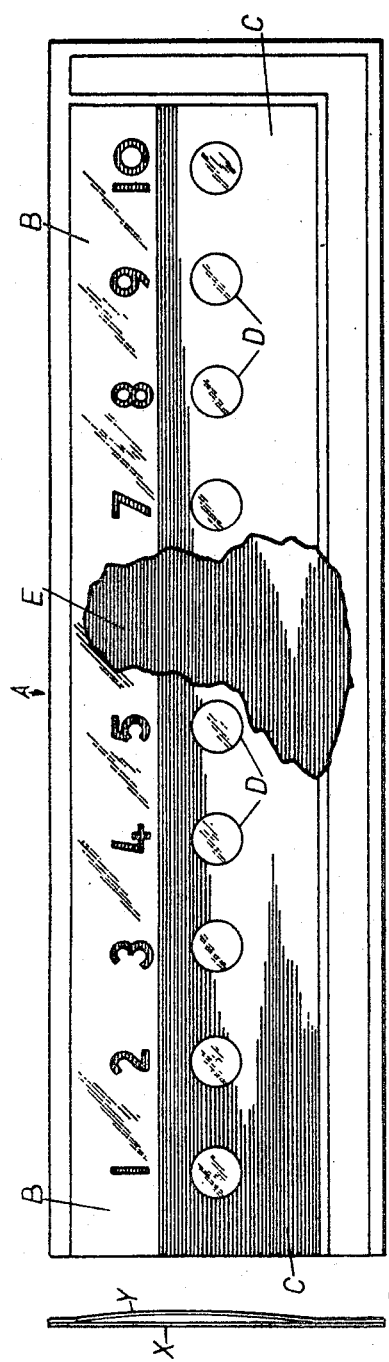
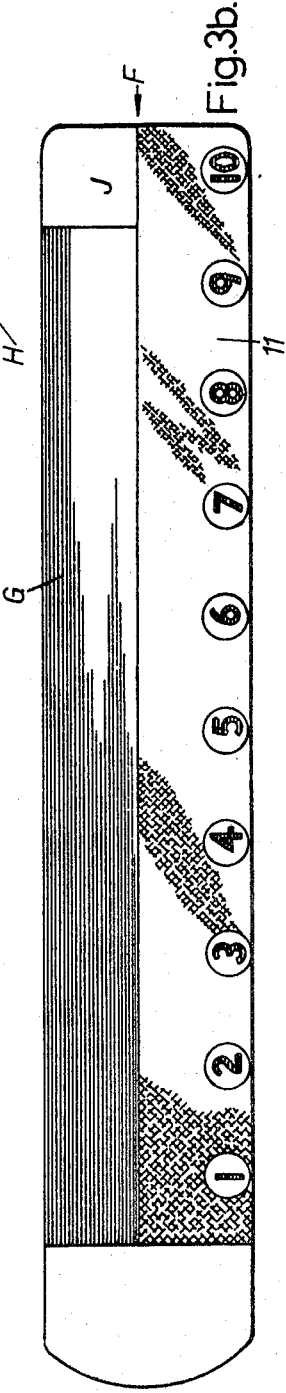
INVENTOR.
CHARLES ARTHUR TACEY
BY
*Linton and Linton*
ATTORNEYS April 1, 1969            C. A. TACEY            3,435,541
DIDACTIC DEVICE FOR TEACHING MATHEMATICS TO CHILDREN
Filed Aug. 1, 1967            Sheet 2 of 4
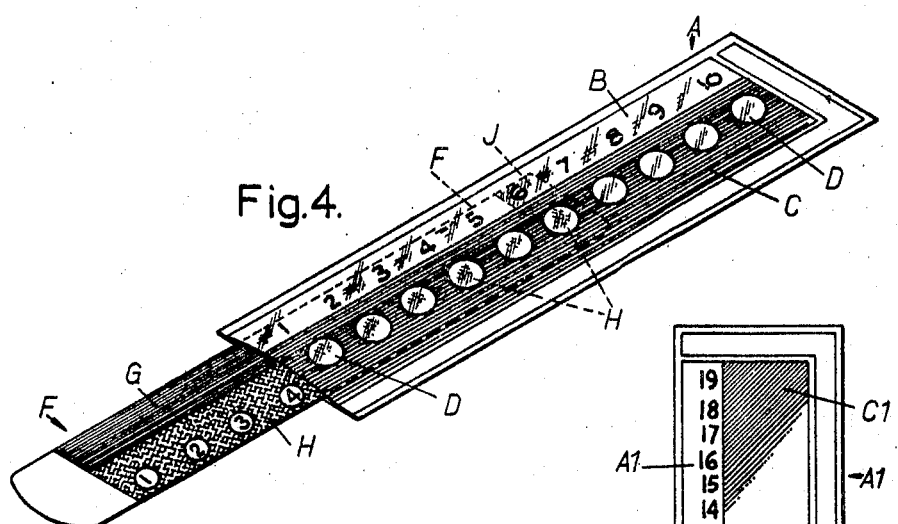
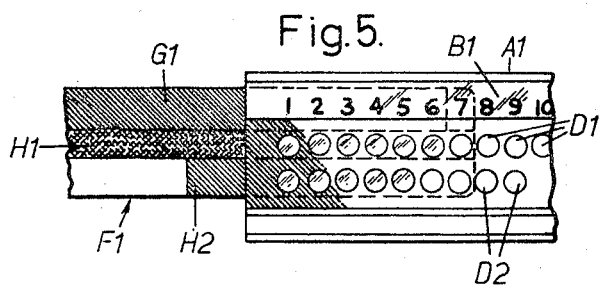
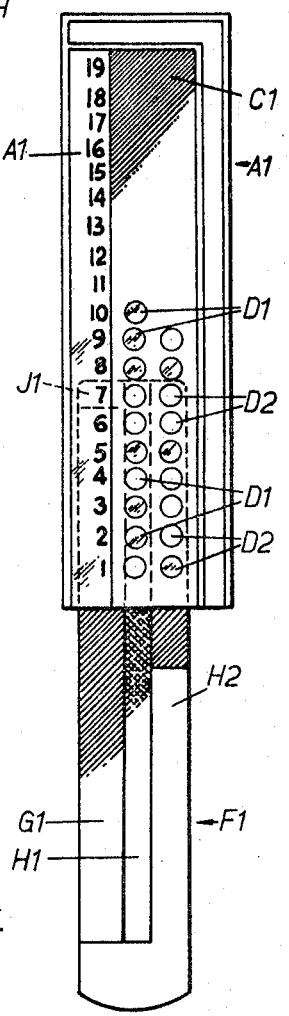
INVENTOR:
CHARLES ARTHUR TACEY
BY
Linton and Linton
ATTORNEYS

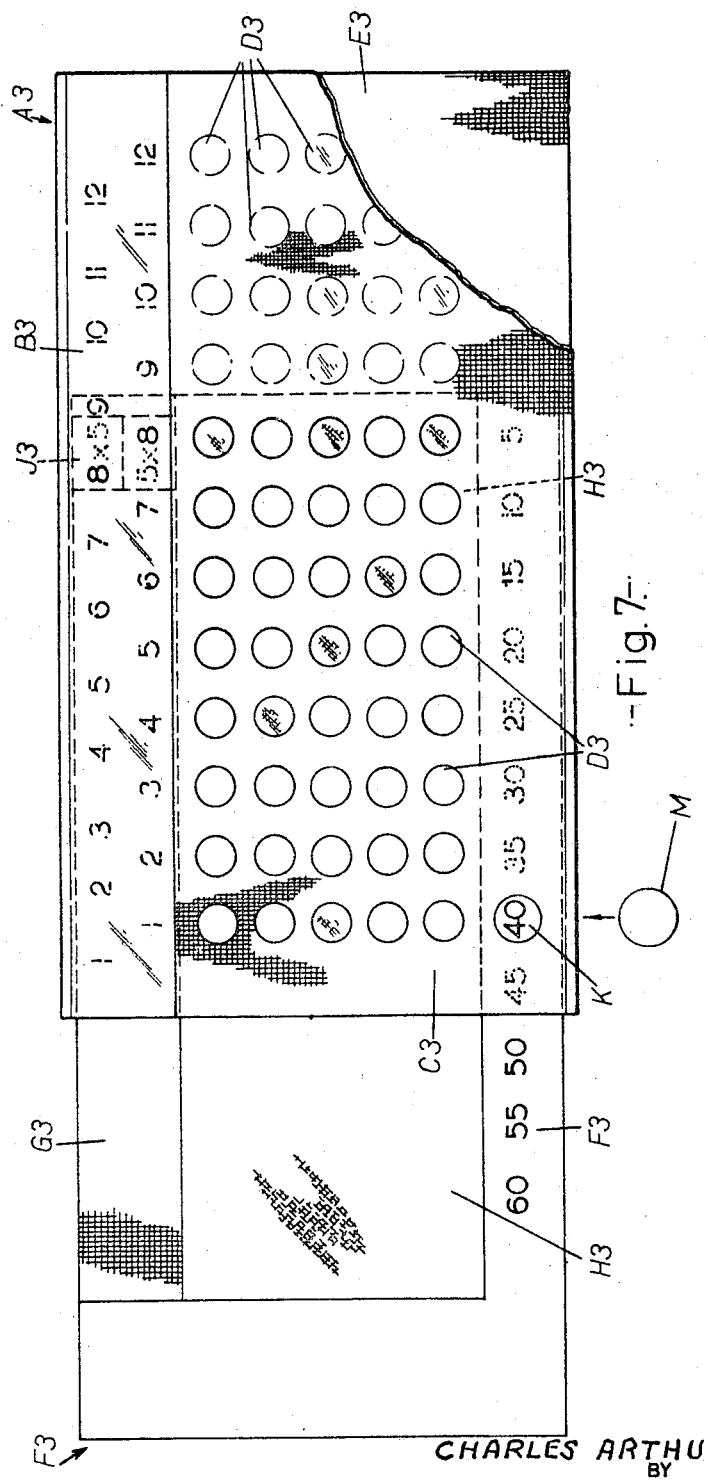

INVENTOR:
CHARLES ARTHUR TACEY

United States Patent Office 3,435,541
Patented Apr. 1, 1969

3,435,541
DIDACTIC DEVICE FOR TEACHING
MATHEMATICS TO CHILDREN
Charles Arthur Tacey, London, England, assignor to
Philograph Publications Limited, London, England, a
British company
Filed Aug. 1, 1967, Ser. No. 657,659
Claims priority, application Great Britain, Aug. 5, 1966,
35,182/66
Int. Cl. G09b 23/02, 19/02, 1/16
U.S. Cl. 35—31                    6 Claims

ABSTRACT OF THE DISCLOSURE

A device which comprises a sleeve and a slide which is axially displaceable within the sleeve. The sleeve has an opaque area and a transparent display panel through which its interior surface is visible. The display panel is marked with a series of numerals and the opaque area includes a series of transparent areas or windows having a positional relationship with the numerals. The slide is provided with coloured areas visible through the transparent areas which relate to the numerals of the display panel.

---

This invention relates to didactic apparatus, more particularly for use by children of school age, and has for its object to provide a novel, compact, simple and inexpensive device or appliance for use in teaching children ordination, cardination, addition, subtraction, multiplication and division, and other processes and facts.

A further object is to provide such devices or appliances which will be capable of displaying numerals and representations of quantities in varying relationships without the need for the indices themselves to be subjected to independent manipulations.

A still further object is to provide such devices or appliances which may be manufactured to any required size—within limits—and which therefore may be constructed for individual use or for use in class or group demonstrations.

A device or appliance according to the invention broadly comprises an outer sleeve and a slide which is adapted for axial displacement within said sleeve. Said sleeve is formed or provided with a transparent display window or panel extending longitudinally thereof and through which window or panel is visible an opposed interior surface of the sleeve. Said display panel is marked with a series of spacedly arranged numerals in a colour corresponding or substantially so to that of the visible interior portion of the sleeve. Alongside said display panel of said sleeve there is provided a series of spacedly arranged transparent areas or windows which may be in the form of circles, squares, or other visually significant shapes. The transparent areas have a positional and numerical relationship with the numerals printed in the display panel.

The slide for co-operation with said sleeve is provided with coloured bands or areas, (hereinafter usually referred to as "numeral indicator" bands and "quantity indicator" bands) adapted in movement of the slide within the sleeve to make visible and show up by colour contrast various relationships between the numerals of the display panel and the transparent areas adjacent thereto.

In axial manipulation of the slide a light area—usually referred to as the numeral indicator panel—of the numeral indicator band may be positioned behind any selected numeral (or numerals) of the series of numerals printed on the display panel and will render such numeral (or numerals) outstandingly visible by colour contrast. Simultaneously, the quantity indicator band will become visible through a number of the transparent areas or windows, the number of areas thus made outstandingly visible bearing a predetermined relationship to the numeral (or numerals) denoted. A child may thus be taught, for example, the ordinal, cardinal, and quantitative value of a number, or number relationships, by reference to the areas made visible as coloured spots or discs.

The invention is further described with the aid of the accompanying drawings which illustrate, by way of example only, and not of limitation, several modes of embodiment.

In said drawings:

FIGURE 1 is a front elevation, and

FIGURE 2 an end view of the outer sleeve of a didactic device for use in dealing with numbers 1 to 10.

FIGURE 3a depicts one side of a slide member for use in co-operation with the sleeve of FIGURES 1 and 2, and FIGURE 3b depicts the reverse side of said slide of FIGURE 3a.

FIGURE 4 is a perspective view of the sleeve of FIGURES 1 and 2 with the slide member of FIGURES 3a, 3b in operative position.

FIGURE 5 is a fragmentary elevation depicting a device according to the invention for use in demonstrating mathematical concepts involving numbers in excess of 10.

FIGURE 6 is an elevation of a device similar to that of FIGURE 5 but with the numerals thereof arranged so as to be inspected as a column, as distinct from horizontally.

FIGURE 7 is an elevation of a device arranged for use in demonstrating and teaching multiplication and division tables, and FIGURE 8 the device of FIGURE 7 but with an alternative slide member.

Figure 8:
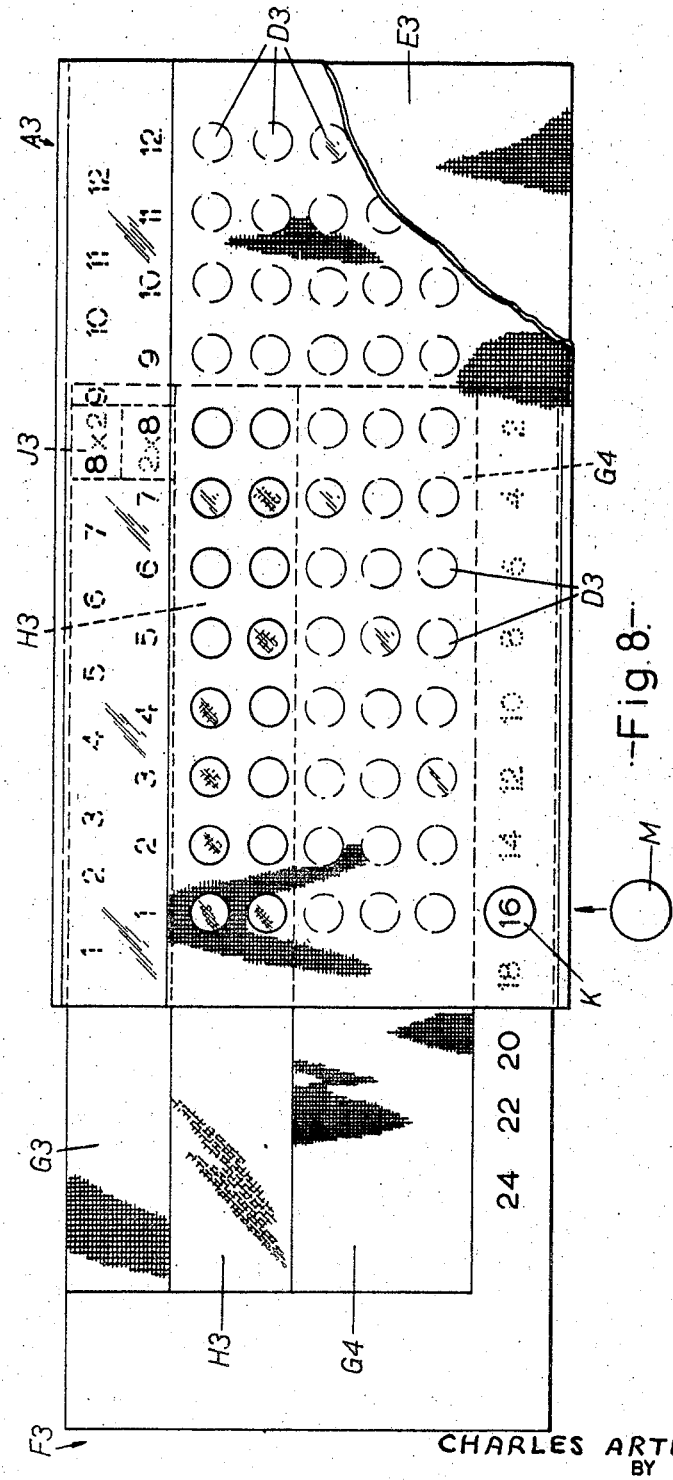

Referring now to said drawings, and more particularly to FIGURES 1, 2, 3a, 3b and 4, the device illustrated comprises an outer sleeve, generally designated A, which may be composed of two rectangular sheets X, Y of a suitable plastics substance adhered together as by thermo-welding around three sides. Said sleeve has a transparent display panel B extending for its full length and for approximately one-third of its width, and spacedly printed in numerical order on said display panel, as shown, are the numerals 1 to 10. Below each of said numerals 1 to 10 in the otherwise opaque area C of the sleeve A is a transparent circular area or spot D. The opaque areas or parts of the sleeve may be obtained by appropriately printing onto a transparent plastics material in a suitable dark colour. The interior portion E of the sleeve A which is visible through the transparent portions is of a colour substantially the same as that of the printed numerals 1 to 10 whereby the latter are normally substantially invisible or difficult of perception. The transparent areas D may of course be constituted by apertures or windows formed in the sleeve A if so desired, and the term "transparent areas" used in respect of such areas D is herein intended to include such apertures or windows.

The slide F for co-operating with said sleeve A is provided with two longitudinally extending coloured bands G and H (FIGURE 3a) one of which bands G is arranged to extend, in movement of the slide, behind the numerals 1 to 10 of a display panel B and the band H behind the transparent areas or spots D. Said first mentioned band G, i.e. the numeral indicator band, is of the same colour or substantially so as the printed numerals with the exception of a small numeral indicator panel J, at its inner end which is white or light in colour. The second, quantity indicator band H, is also of a comparatively light colour being say orange.

In manipulation of the slide F, the numeral indicator panel J of the band G may be positioned behind any of the numerals 1 to 10 printed on the display panel B (see FIGURE 4) and will render such numeral outstandingly visible by reason of the colour contrast. Simultaneously, the quantity indicator band H will become visible through a number of the transparent areas D, the number of areas thus made visible corresponding to the numeral denoted in the display panel B. A child may thus be taught the quantitative value of a number by reference to the number of areas D made visible as coloured spots or discs.

Such a device may be also employed to teach simple addition and subtraction by employing a slide F (see FIGURE 3b) bearing as shown the numerals 1 to 10 at spacings corresponding to those of the numerals of the display panel B and in the same numerical order. Thus, as the slide F is entered into the sleeve A the numerals on the quantity indicator band H of the slide will be progressively covered as the numerals of the display panel B are progressively displayed. For example, if the numeral indicated on the panel B is 6, as shown in FIGURE 4, the numerals 5 to 10 of the slide F will be concealed leaving the numbers 1 to 4 displayed. The relationship between the numbers 6 and 4 can thus be employed to denote either 6+4=10, or 10−6=4.

In another mode of embodiment, see FIGURES 5 and 6, suitable for teaching counting, and adding or subtracting, employing the numerals 1–19 and which permits instruction in the nature of place values, or positioned notation, the face of an outer sleeve $A^1$ is provided as before with a longitudinally extending transparent panel $B^1$, but in this instance the numerals printed thereon in numerical order range from 1 to 19. A row of 10 transparent areas (e.g. circles) $D^1$ are provided in respect of the numerals 1 to 10, and a second row of similar transparent areas $D^2$ are provided adjacent to and in alignment with the first row $D^1$ in respect of the numerals 1 to 9.

A slide $F^1$ is provided with a numeral indicator band $G^1$ and numeral indicator panel $J^1$ adapted to operate as before described to indicate by colour contrast any one of the numerals 1 to 19. Said slide $F^1$ has a quantity indicator band $H^1$ in respect of the first row of transparent areas $D^1$ and also a quantity indicator band $H^2$ in respect of the second row of areas $D^2$, but said latter band $H^2$ is arranged so as only to become operative after the first row of areas $D^1$ has been fully displayed by the band $H^1$. Preferably, but not essentially, said second quantity indicator band $H^2$ is of a colour different to that of said first band $H^1$.

In the use of this device numbers, and values or quantities, up to 10 may be denoted using any of the first row of areas $D^1$. For numerals above 10, up to and including 19, the second row of areas $D^2$ become visible and may be used to teach subtraction and a composition of values up to 19.

Referring now to FIGURE 7, this illustrates a form of the invention which may be employed to teach multiplication and division tables. In this embodiment, an outer sleeve $A^3$ is provided with a transparent display panel $B^3$ over-printed with two rows of numerals 1 to 12 in staggered relationship as shown (representing say multipliers) and a numeral indicator band $G^3$ of the slide $F^3$ is provided with numerals (representing say multiplicands) and with multiplication signs, as shown.

A plurality of rows of transparent areas $D^3$ are provided in the otherwise opaque area $C^3$ of the sleeve $A^3$ and are arranged in relation to the quantity indicator band $H^3$ of a slide $F^3$ so as to demonstrate quantitatively the products of the multipliers and multiplicands indicated in the display panel $B^3$ of the sleeve.

Said sleeve also may have a small display panel or window K, provided with a removable or replaceable, e.g. self-adhesive, cover-piece M, through which may be displayed numerically the products of the multipliers and multiplicands for the time being indicated in the main display panel $B^3$. The numerals indicating the numerical product may be printed at appropriate spacings on the area of the slide $F^3$ below the quantity indicator band $H^3$.

The device may thus be used for self-testing purposes, as a child is able to check his findings by reference to what may be termed the answer window K. For example, in FIGURE 7 the slide $F^3$ is shown positioned in the sleeve $A^3$ so that the numerals 5 carried by the numeral indicator panel $J^3$ of the slide $F^3$ are in register with the numerals 8 of the display panel $B^3$. Thus there is displayed the relationship 8×5 and 5×8 in the display panel $B^3$, and the quantity indicator band $H^3$ makes visible, in effect, forty of the circular areas $D^3$ and the number 40 is displayed in the answer window K. The device also illustrates converse divisional relationships.

As before described in respect to FIGURES 1 to 6, the numerals of the display panel $B^3$, the numeral indicator band $G^3$, and the interior $E^3$ of the casing $A^3$ visible through the transparent portions of the casing are all of the same, preferably dark colour, and the numeral indicator panel $J^3$ and quantity indicator band $H^3$ of the slide are of a contrastingly light colour or colours.

Referring to FIGURE 8, this illustrates a device substantially the same as that of FIGURE 7 but with an alternative slide $F^3$. In this instance the slide carries in its numeral indicator panel $J^3$ the indicia ×2 and 2×, and a band $G^4$ is provided which is the same colour as the interior of the sleeve $A^3$. Said band $G^4$ is of dimensions such that, in movement of the slide, the three lower rows of the areas $D^3$ are rendered inoperative and only the upper two rows are employed to indicate quantitatively the products of the numerals for the time being identified in the display panel $B^3$.

It will be seen that didactic devices or appliances according to the invention provide simple and inexpensive means whereby children may be taught to count from 1 to any numeral displayed within the operative area of the device and to carry out operations involving addition, subtraction, multiplication and division.

The devices will be particularly advantageous in use inasmuch as numerical relationships may be altered and new ones created by the mere movement of a slide within an outer sleeve.

It will of course be understood that to increase the range of a particular device according to the invention, both sides of the slide (for example as described in relation to FIGURES 3a and 3b) may be printed with co-operating coloured bands, indices and transparent areas. Further, a single outer sleeve may be designed for use with one or a set or series of co-operating slides. For example the sleeve $A^3$ of the device of FIGURE 7 is shown provided with a total of 60 transparent areas $D^3$ whereby a series of slides as $F^3$ may be employed therewith bearing multiplicands (or multipliers) usable with said sleeve so that all multiplication tables having products up to and including 60 may be employed.

What I claim as my invention and desire to secure by Letters Patent is:

1. A device for use in teaching mathematics, comprising an outer sleeve provided with a transparent panel and an opaque area extending longitudinally thereof, the interior of said sleeve being of a predetermined colour, a series of numerals printed on said display panel, a series of spacedly arranged transparent areas provided in the otherwise opaque area of the sleeve, said transparent areas having a numerical and positional relationship with the numerals of the display panel, and said numerals and the opaque area of the sleeve being of a colour similar to the colour of the interior of said sleeve visible through the transparent parts, a slide for axial displacement within said sleeve, said slide being provided on at least one side with coloured areas arranged in movement of the slide within the casing to show by colour contrast relationships between numerals of the display panel and the number of transparent areas for the time being made visible by the positioning of the slide therebehind.

2. A didactic device, as claimed in claim 1, wherein said slide is marked with a series of spacedly arranged numerals which become progressively concealed as the slide is inserted in the sleeve.

3. A didactic device, as claimed in claim 2, wherein the transparent shapes are arranged so as to illustrate quantitatively the results of subtracting or adding the numerals indicated in the display panel and on the slide.

4. A didactic device, as claimed in claim 2, wherein the numerals of the display panel of the outer sleeve and numerals of the slide are arranged for use in teaching multiplication and division and the transparent areas are arranged to illustrate quantitatively the products of the numerals for the time being indicated in the display panel.

5. A didactic device, as claimed in claim 4, wherein said outer sleeve is provided with a window, and said sleeve with a series of numerals arranged so as to indicate the products of the numerals indicated in the display panel.

6. A didactic device as claimed in claim 1, wherein said outer sleeve is flat and of uniform cross-section, and said slide is a flat strip of relatively stiff material corresponding in dimensions to the interior dimensions of said sleeve.

References Cited

UNITED STATES PATENTS

| | | |
|---|---|---|
| 1,664,808 | 4/1928 | Cooper. |
| 1,941,733 | 1/1934 | Badanes _____ 35—75 |
| 2,600,084 | 6/1952 | Svensson. |

WILLIAM H. GRIEB, *Primary Examiner.*

U.S. Cl. X.R.

35—75